United States Patent [19]

Pitcher

[11] Patent Number: 4,623,868
[45] Date of Patent: Nov. 18, 1986

[54] VARIABLE ELECTRICAL RESISTANCE DEVICE

[75] Inventor: Arnold Pitcher, Romford, England

[73] Assignee: Crystalate Electronics Limited, Kent, United Kingdom

[21] Appl. No.: 689,799

[22] Filed: Jan. 8, 1985

[30] Foreign Application Priority Data

Jan. 10, 1984 [GB] United Kingdom ................ 8400570
Nov. 1, 1984 [GB] United Kingdom ................ 8427641

[51] Int. Cl.⁴ ........................................... H01C 10/30
[52] U.S. Cl. .................................. 338/160; 338/162; 338/171
[58] Field of Search ............... 338/189, 188, 160, 87, 338/96, 116, 135, 167, 169, 171, 173, 174, 175

[56] References Cited

U.S. PATENT DOCUMENTS 3,896,410 7/1975 Matthews et al. ............. 338/173 X
3,965,454 6/1976 Puerner ........................... 338/174
4,159,460 6/1979 Magami et al. ................. 338/162

Primary Examiner—E. A. Goldberg
Assistant Examiner—M. M. Lateef
Attorney, Agent, or Firm—Shoemaker and Mattare, Ltd.

[57] ABSTRACT

A variable electrical resistance device for monitoring displacement of a mechanical component such as a vehicle road wheel suspension system having a housing; an electrically resistive track and conductive slip ring on a support in the housing; electrically conductive wipers on a rotatable carrier provided with a spindle for coupling to the component. The wipers traverse the resistive track and the slip ring respectively. The support is mounted on springs or flat strips of resilient metal, so as to be displaceable away from and towards the wipers. A solenoid, of double-acting type or acting in association with the bias of the springs, has an armature operating to effect displacement of the support away from and towards the wiper whereby contact between the wiper and track may be broken, or the contact pressure therebetween reduced, when monitoring is not required, thereby prolonging the life of the wiper and track assembly.

2 Claims, 3 Drawing Figures

VARIABLE ELECTRICAL RESISTANCE DEVICE

FIELD OF THE INVENTION

This invention relates to a variable electrical resistance device such as a potentiometer, particularly intended for use in monitoring displacement of a mechanical component, which component frequently or continuously undergoes displacement of varying amplitude in a linear or rotary sense. The invention finds particular, although not exclusive, application in the automotive field where it may, for example, be used in monitoring displacement or position of a vehicle road wheel suspension or of an engine throttle.

BACKGROUND TO THE INVENTION

Increasing application of electronics for control and management in the automotive field, with widespread involvement of microprocessors, has led to a corresponding requirement for sensors for use in converting mechanical displacement of components during operation into electrical signals proportional thereto. Variable electrical resistance devices, notably potentiometers, are being increasingly utilised in automotive monitoring systems, e.g for monitoring position or displacement of a rotatable throttle in an engine induction manifold. There is also now a requirement for road wheel suspension displacement to be monitored as part of a servo control system for the suspension.

Variable resistance devices commonly comprise a wiper of electrically conductive material supported in a housing and adapted for motion in a linear or rotary sense to traverse a track of electrically resistive material. When operating as a potentiometer, a voltage is applied to terminals connected to the ends of the resistive track and an output voltage, whose magnitude is a function of the position of the wiper along the track, is derived at a terminal connected to the wiper. In order to monitor displacement or position of a mechanical component, the component is mechanically coupled to the wiper and the output voltage derived at the wiper terminal provides a representation of the displacement or position of the component.

Problems arise when a variable resistance device is required to monitor displacement of a component, such as a vehicle road wheel suspension, which is undergoing a large number of operating cycles of varying frequency and amplitude. In such a situation wear occurs in the wiper and/or resistive track leading to failure of the device after an unsatisfactorily short period of time. This wear is further increased by a tendency for the wiper to dither on the track e.g. as a result of mechanical vibration. Longevity of variable resistance devices has been improved by the use of a conductive polymer material for the resistive track since this material, in some measure, possesses self-lubricating properties. Using such a material, a life of twenty million operations of a wiper over the entire length of the resistive track can be achieved. However, even this is insufficient for some applications, such as with vehicle road wheel suspension monitoring systems where a life of ten times longer may be required.

The present invention seeks to overcome this problem by making use of the realisation that continuous monitoring of the output of the variable resistance device is often not required. The invention consequently has for its object the provision of means whereby the wiper and resistive tracks are only brought into full contact with one another when monitoring is required and are arranged to be held out of contact, or with reduced pressure of contact therebetween, at other times.

SUMMARY OF INVENTION

The present invention provides a variable electrical resistance device for monitoring displacement of a mechanical component, said device comprising: a housing; an electrically resistive track supported on or in said housing; an electrically conductive wiper moveably supported in said housing and adapted to traverse said resistive track, said wiper being adapted to be mechanically coupled to said external component to follow displacement thereof; first and second terminals electrically connected to ends of said track; a third terminal electrically connected to said wiper; said device being characterised in that means are provided to effect relative displacement of said wiper and said track away from and towards one another whereby contact between said wiper and said track may be broken or the contact pressure therebetween reduced, during periods when said monitoring by said device is not required.

The said electrically resistive track may suitably be secured to a support, said support being moveable to effect displacement of said track away from and towards said wiper.

In one embodiment the said support for said track may conveniently be mounted on one or more springs, or be spring biased, in such a way that the support is normally held with the track in contact with the wiper and is caused to be retracted and held against the action of the one or more springs or the spring bias, to break contact, or reduce the pressure of contact, between the wiper and the track. In this embodiment a solenoid arrangement is preferably used to retract and hold the support against the action of the one or more springs, or the spring bias, to break or reduce the pressure of the contact between the wiper and the track.

In an alternative embodiment the said support for the track may be mounted on one or more springs, or be spring biased, in such a way that the support is normally held with the contact between the wiper and the track broken or with the pressure of contact therebetween reduced, the support being caused to be advanced against the action of the one or more springs, or the spring bias, to bring the wiper and the track into full contact. In this embodiment a solenoid arrangement may be used to advance the support against the action of the one or more springs, or the spring bias, to bring the wiper and track into full contact.

In a still further embodiment the said support for the track may be located in said housing by means of a plurality of strips of resilient material, each of said strips extending between said support and said housing or a part secured to said housing, said strips providing no natural bias of said support towards or away from said wiper, double acting solenoid means being provided associated with said support, and capable of activation to displace said support in opposite directions as required, to hold said track in full contact with said wiper or to hold said track out of contact, or in reduced contact, with said wiper.

In the above embodiments, the said one or more springs or the said plurality of strips of resilient material may, if desired, comprise electrically conductive material and be utilised to provide one or more electrical connections to said track and/or to an electrically conductive slip ring provided on said support for making electrical connection with said wiper.

One or more stop means may be provided on said housing to limit movement of said support. The wiper is suitably mounted on a carrier which is arranged for mechanical coupling to the said external component.

The said variable resistance device preferably operates as a potentiometer, a voltage source being connected to the said first and second terminals and an output voltage being derived at the said third terminal, said output voltage being a function of the position of said wiper on said track and hence of the displacement of the said mechanical component.

BRIEF DESCRIPTION OF THE DRAWINGS

The invention is now described by way of example with reference to the accompanying drawings in which.

DETAILED DESCRIPTION OF PREFERRED EMBODIMENTS

Figure 1:
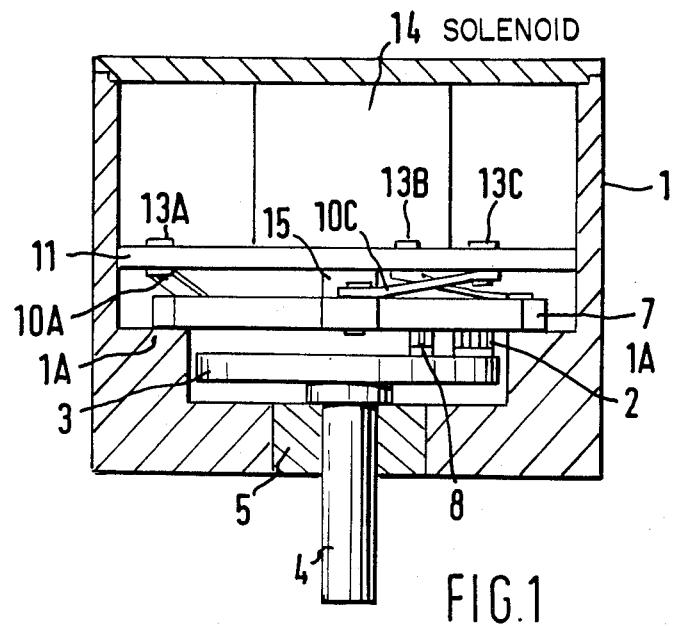
FIG. 1 represents a part sectional view of an embodiment of variable electrical resistance device according to the invention.
Figure 2:
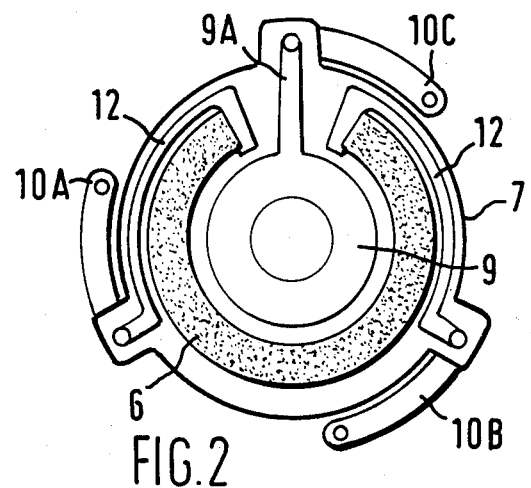
FIG. 2 represents a plan view of a resistive track support for use in the embodiment of FIG. 1 and adapted for displacement relative to an electrically conductive wiper.

Variable resistance device embodied as a rotary potentiometer comprises a housing 1, suitably formed from a plastics material. A wiper 2 of resilient electrically conductive material is secured to an electrically insulating carrier 3 having a spindle 4 extending therefrom. The carrier 3 is located in a recess in the housing 1 with the spindle 4 rotatably mounted in bearings 5 in an opening in the housing. The spindle 4 extends from the housing 1 and is arranged to be mechanically coupled to an external component (not shown) such that it is rotatable by the component to follow displacement thereof. Such rotation of the spindle may result, for example, from displacement of an automotive vehicle road wheel suspension system, or from displacement of a throttle or butterfly valve in an engine induction manifold, such displacement being required to be monitored. An arcuate electrically resistive track 6, e.g. comprising a film of electrically resistive material such as an electrically conductive polymer, is provided on a support 7 of electrically insulating material. The resistive track 6 is arranged to be traversed by wiper 2. Wiper 2 is electrically connected to a further wiper 8, suitably of the same material as wiper 2, and which is arranged to contact a slip ring 9 of electrically conductive material provided on the support 7.

The support 7 is provided with three springs 10A, 10B, and 10C by means of which it is secured to a member 11 fixed to the housing 1 and such that the springs 10A, 10B and 10C bias the support 7 towards the wipers 2 and 8. In this position, the support 7 contacts stop means in the form of projections 1A provided on the housing 1, and the wipers 2 and 8 make full contact with the resistive track 6 and slip ring 9 respectively. Two of the springs, 10A and 10B also serve to provide electrical connection between electrical conductors 12, extending from the ends of the resistive track 6, and electrical terminals 13A and 13B secured to the member 11. The third spring 10C, also provides electrical connection from a conductor 9A, extending from the slip ring 9, to a terminal 13C secured to the member 11. Further terminals (not shown) electrically connected to terminals 13A, 13B and 13C, may be provided on the exterior of the housing 1 for connection to external circuits as required.

A solenoid 14 is mounted in the housing 1 and has an armature 15 slideably mounted therein and secured to the support 7. When the solenoid 14 is electrically energised by supplying an electric current thereto, the armature 15 moves and causes the support 7 to be displaced in a direction away from the wiper carrier 3, against the bias of the springs 10A, 10B and 10C. Pressure of the wipers 2, 8 on the resistive track 6 and slip ring 9 respectively is thereby reduced. It is preferably arranged for contact between the wipers and the track and slip ring to be broken completely when the support 7 is displaced during energisation of the solenoid 14.

This arrangement provides a means whereby the wipers 2, 8 may be brought into full contact with the resistive track 6 and slip ring 9, respectively, only during periods when it is actually required to monitor the displacement of the external component coupled to the spindle 4. Such monitoring is effected by applying a voltage to the ends of the resistive track 6 by way of terminals 13A and 13B and measuring the output voltage at the wiper 2 by way of the wiper 8, slip ring 9 and terminal 13C. This output voltage is proportional to the displacement of the external component. When no monitoring is required, the solenoid is energised to retract the support 7, and hence the resistive track 6 and slip ring 9, from the wipers 2 and 8. Wear in the device is thereby reduced and the life of the device consequently can be greatly extended.

If desired, the device may be modified such that the springs 10A, 10B and 10C, maintain the support 7 biased away from the wipers 2 and 8, when the solenoid 14 is deenergised. Energising of the solenoid 14 is arranged to cause the armature 15 to push the support 7 towards the wipers 2, 8 and bring the latter into the necessary contact with the resistive track 4 and slip ring 9 to enable the device to operate.

In a further embodiment, the springs 10A, 10B and 10C are replaced by substantially flat strips of resilient metal (not shown) extending between the support 7 and the housing 1, the arrangement being such that these flat strips provide no natural bias of the support 7 either towards or away from the wipers 2 and 8. Solenoid 14 is replaced by a solenoid of double acting type arranged with the armature 15 thereof secured to support 7. When the solenoid is activated in one sense, the support 7 is displaced by the armature in a direction such as to bring the track 6 and slip ring 9 into full contact with the wipers 2 and 8. When the solenoid is activated in an opposite sense, the support 7 is displaced by the armature in an opposite direction to bring the track 6 out of contact with the wiper 2 or to reduce the pressure of contact between the wiper 2 and track 6. In this embodiment, the solenoid is used to hold the support in the two opposed positions of displacement and spring bias is not relied upon in any way.

Figure 3:
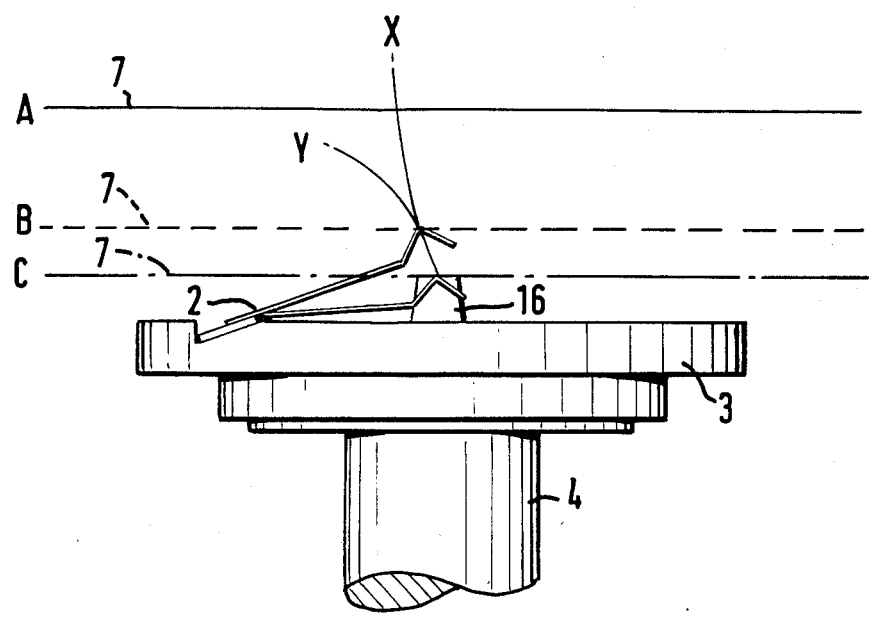
FIG. 3 illustrates a detail of a preferred interrelationship between wiper and resistive track support in a variable electrical resistance device according to the invention.

A problem which may arise as a result of mounting the support 7 on the three springs or strips of resilient material 10A, 10B, 10C, is that when the support 7 moves towards the wiper 2 from its retracted position, slight twist or rotation of the support 7 takes place. This means that after the wiper 2 has made initial contact with the resistive track 6 on the support 7, further movement of the support 7 towards the wiper 2, whereby the wiper comes into its full contact position with the resistive track 6, is accompanied by twist or rotation of the support 7. The position of the wiper 2 on the track 6 will effectively change during this final stage of movement of the support 6, which is undesirable. In order to minimise or overcome this problem, the arrangement shown in FIG. 3 is adopted. As the support 7 moves from its retracted position A to a position B where initial contact is made with the wiper 2 and then into position C where full contact is made with the wiper 2, the support 7 twists or rotates and a particular point thereon describes an arc as indicated by reference letter X. It is arranged for the wiper 2 to be mounted such that its point of contact with the resistive track on the support 7 describes an arc as indicated by reference letter Y as the support 7 moves from position B to position C. Between positions B and C of the support 7, the arc X substantially coincides with the arc Y and hence the position of the wiper 2 on the resistive track 6 on the support 7 remains substantially fixed during movement of the support 7 between the two positions.

A protrusion 16 may be provided on the wiper carrier 3 to contact the support 7 in position C.

I claim:

1. A variable electrical resistance device for monitoring displacement of a mechanical component, said device comprising: a housing; an electrically resistive track supported on or in said housing; an electrically conductive wiper moveably supported in said housing and adapted to traverse said resistive track, said wiper being adapted to be mechanically coupled to said external component to follow displacement thereof; first and second terminals electrically connected to ends of said track; a third terminal electrically connected to said wiper; said device being characterised in that means are provided to effect relative displacement of said wiper and said track away from and towards one another whereby contact between said wiper and said track may be broken, or the contact pressure therebetween reduced, during periods when said monitoring by said device is not required; said electrically resistive track being secured to a support, said support being moveable to effect displacement of said track away from and towards said wiper; said support for said track being mounted on one or more springs, or being spring biased, in such a way that the support is normally held with the track in contact with the wiper and is caused to be retracted and held against the action of the one or more springs or the spring bias, to break contact, or reduce the pressure of contact, between the wiper and the track; and a solenoid arrangement is used to retract and hold the support against the action of the one or more springs, or the spring bias, to break or reduce the pressure of the contact between the wiper and the track.

2. A variable electrical resistance device for monitoring displacement of a mechanical component, said device comprising: a housing; an electrically resistive track supported on or in said housing; an electrically conductive wiper moveably supported in said housing and adapted to traverse said resistive track, said wiper being adapted to be mechanically coupled to said external component to follow displacement thereof; first and second terminals electrically connected to ends of said track; a third terminal electrically connected to said wiper; said device being characterised in that means are provided to effect relative displacement of said wiper and said track away from and towards one another whereby contact between said wiper and said track may be broken, or the contact pressure therebetween reduced, during periods when said monitoring by said device is not required; said electrically resistive track being secured to a support, said support being moveable to effect displacement of said track away from and towards said wiper; said support for the track being mounted on one or more springs, or being spring biased, in such a way that the support is normally held with the contact between the wiper and the track broken or with the pressure of contact therebetween reduced, the support being caused to be advanced against the action of the one or more springs, or the spring bias, to bring the wiper and the track into full contact; and a solenoid arrangement is used to advance the support against the action of the one or more springs, or the spring bias, to bring the wiper and track into full contact.

* * * * *